Figure 1:
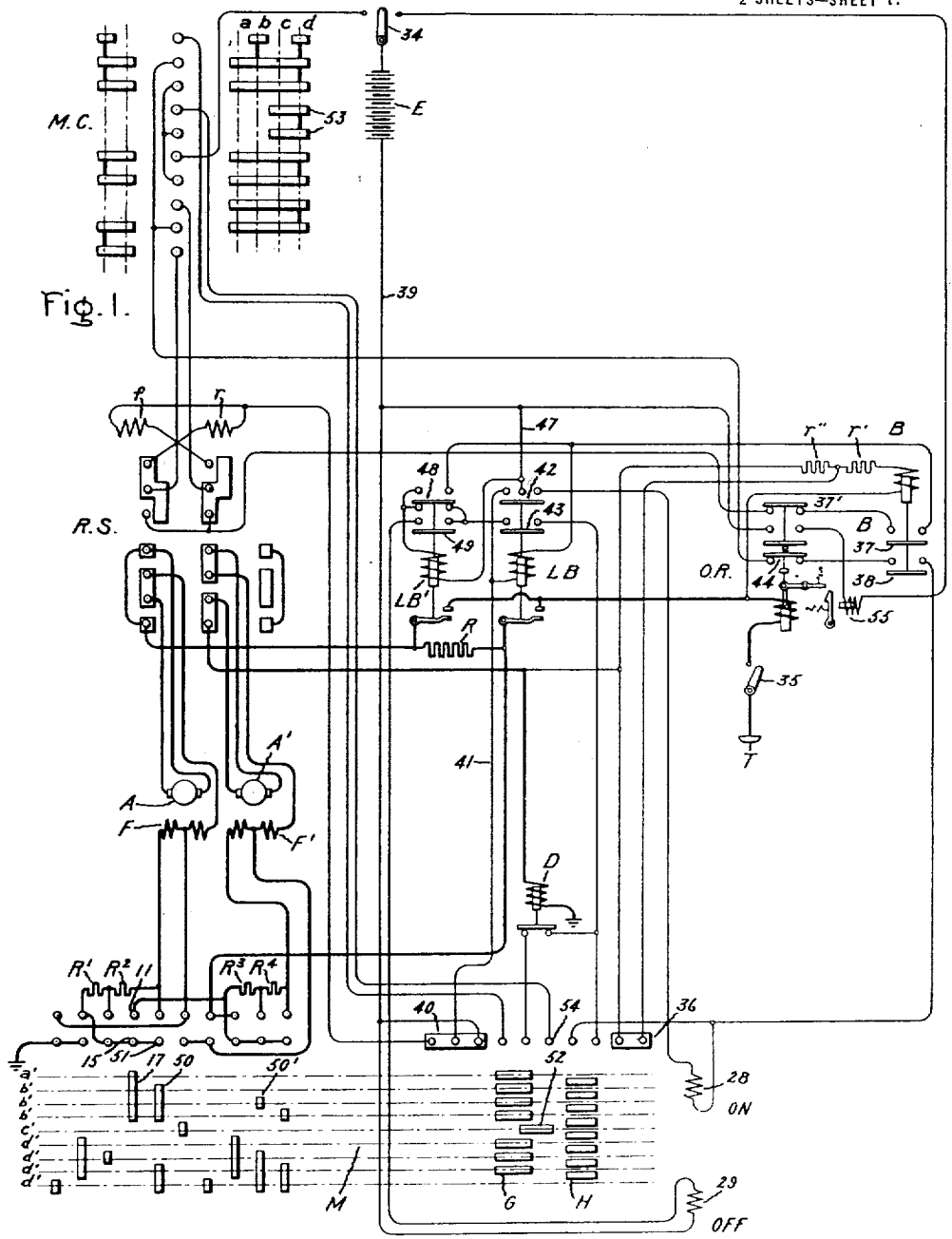

J. F. TRITLE.
MOTOR CONTROL.
APPLICATION FILED OCT. 3, 1919.

1,382,872.

Patented June 28, 1921.
2 SHEETS—SHEET 2.

Inventor:
John F. Tritle,
by Albert G. Davis
His Attorney.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

MOTOR CONTROL.

1,382,872. Specification of Letters Patent. Patented June 28, 1921.

Application filed October 3, 1919. Serial No. 328,286.

*To all whom it may concern:*

Be it known that I, JOHN F. TRITLE, a citizen of the United States, residing at Schenectady, county of Schenectady, State of New York, have invented certain new and useful Improvements in Motor Control, of which the following is a specification.

This invention relates to the control of electric motors and has for its object the provision of improved means whereby electric motors are started, stopped, and generally controlled in a simple, reliable and efficient manner.

While my invention is capable of general application in the motor control field, it is of particular importance in the control of electric railway motors.

In my former Patent No. 1,310,040, dated July 15, 1919, I have shown a control system for electric motors in which a plurality of unit switches are forced to close against a spring tension by cams which in turn are operated by electropneumatic means under the control of a master controller. This invention comprises certain improvements relating to the operating means, particularly as regards the arrangement for operating the unit switches, and has for its object the provision of improved means whereby the mechanism will start quickly from one point to the next, without materially affecting the time taken in stopping the mechanism at the definite control points or the total time for advancing from the off position to the full running position or from the running position to the off position. In one of its aspects my invention relates to electro-pneumatic operation and it provides improved means whereby a greater speed of operation between the definite steps in the control is obtained. In order to satisfactorily stop the controller on the definite control points, the speed of the electro-pneumatic operating means must be reduced. In my former patent referred to, an "on" cylinder and an "off" cylinder are provided and electromagnetic valves are provided for controlling the air pressure in the cylinders to effect movements of the controller as desired, and, in certain of its aspects, my invention relates to improvements in the electro-pneumatic operating means therein shown. In the arrangement of the patent, a relatively small exhaust port for the "off" magnet valve must be provided in order that the controller will stop satisfactorily at the definite control points, and because of that limitation the taking of a control step was not quickly begun. My invention provides means for increasing the speed at starting by the provision of an additional larger exhaust port which is normally open whenever the main controller is on one of the definite control points, and is closed as soon as the controller starts to move to another point. A quick reduction in air pressure will be obtained in the off cylinder to start the controller from the points without materially affecting the stopping and the total time of turning on and off.

Figure 2:
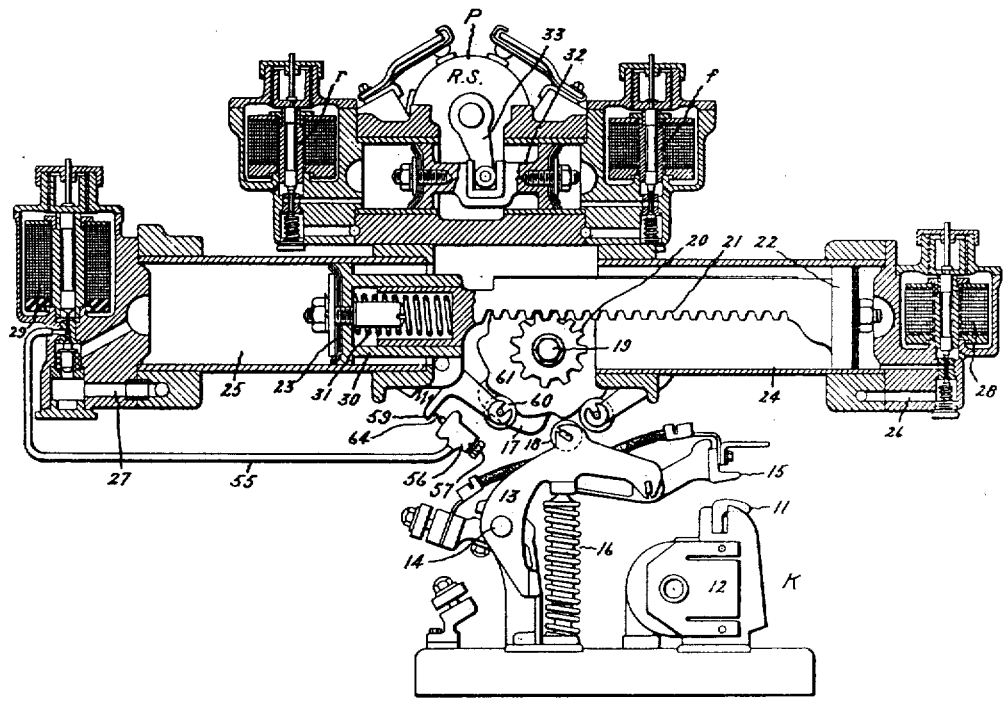
Figure 3:
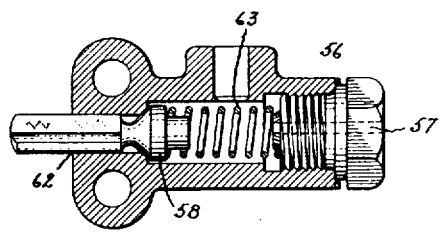

In the accompanying drawings illustrating my invention, Figure 1 is a diagram of a complete motor control system embodying my improvements; Fig. 2 is a sectional view of the electro-pneumatic means for operating the unit switches and Fig. 3 is an enlarged part section of an exhaust valve.

I shall first describe a system of control embodying my improvements and shall then point out more in detail the specific features of my invention.

Looking first at Fig. 1, it will be noted that I have shown a series-parallel system of motor control in which two motors are employed. It will be understood, however, that my invention is in no sense limited to the particular system employed or to the number of motors controlled. The armatures of the two motors are designated A and A', while the fields which are subdivided as hereinafter described are designated F and F'. RS designates the reversing switch as a whole. MC indicates the master controller, and LB and LB' represent the two line breakers. B represents a potential relay which is deënergized so as to return the controller to the off position upon the failure of power. OR represents an overload relay. D represents a current limit relay or throttle, for causing the advance of the main controller to be under the control of the motor current and E represents a battery for energizing the control circuit.

The main controller, which I have designated M, as shown in Fig. 1, consists of a number of cams arranged upon a shaft so as to close the contactors in a predetermined order. Forming a part of the controller and rotated with the cam shaft are two sets of contacts G and H, the purpose of which will be hereinafter described.

The main controller comprises a number of unit switches, one of which is shown at K (Fig. 2), which switches are operated electro-pneumatically. Each switch consists of an insulating base upon which is mounted a stationary contact 11, having a magnetic blowout 12, adjacent thereto, and a contact arm 13 pivoted at 14 and having a contact 15 at its end, coöperating with the stationary contact. The contact arm 13 is normally held in open position by spring 16 as shown in the drawing and is closed by engagement with one of the cam surfaces 17 with a roller 18 on the arm. As before stated, the cams, one of which is shown at 17, are arranged around a shaft 19 and longitudinally thereof, as shown in Fig. 1. The cam surfaces have the proper lengths, as indicated in Fig. 1, to maintain the switches closed for a proper interval. The cam shaft 19 is rotated through the pinion 20 by means of a rack 21 having a piston at each end. These pistons 22 and 23 operate in cylinders 24 and 25 respectively, to which compressed air is admitted through the ports 26 and 27 respectively. The port 26 is normally closed to reservoir and open to atmosphere by the electromagnetically operated valve 28 and is opened by the energization of the magnetizing winding of the valve, while the port 27 is controlled by the normally open electromagnetically operated valve 29. This latter valve is closed when the magnetizing winding is energized. The valve 28, which as above stated is normally closed, connects the cylinder to atmosphere when the winding is deënergized but when the winding is energized, connects the port 26 with the air reservoir so as to admit compressed air to the cylinder 24 so as to move the piston 22 to the left. The valve 29 which is normally open controls the passage from the reservoir to the cylinder so that in the normal position of the valve, with the magnetizing winding deënergized, there will be full reservoir pressure in the cylinder 25. When, therefore, the magnetizing winding of the valve 28 is energized, compressed air will be admitted to cylinder 24 for moving piston 22 to the left, this being the movement which turns the cam shaft in the "on" direction, that is, to operate the proper switches to bring the motors up to speed. This movement will not take place however (except as to the first step as hereinafter described), unless the pressure is exhausted from the cylinder 25 by the operation of the valve 29 which closes the connection between the cylinder and the reservoir, and opens the connection between the cylinder and atmosphere. When, however, the valve 29 is opened by the deënergization of its winding, full reservoir pressure is admitted to the cylinder 25 so that the pressure on the two pistons 22 and 23 will be balanced. Therefore when the magnetizing winding of the valve 28 is energized, and the magnetizing winding of the valve 29 is deënergized, there will be no movement of the cam shaft (except on the first step). Moreover, if while the valve 28 is open and the cam shaft is being moved to the "on" position by the piston 22, the valve 29 should be closed, the movement of the cam shaft will be immediately stopped.

It will be noted that while the piston 22 is fixedly connected to the rack 21, the piston 23 is not so connected with the rack but is yieldingly mounted with respect to the rack. The piston 23 has attached to it a sleeve 30 which fits over the hollowed end of the rack 21, and a spring 31 fits into the hollowed end of the rack, and presses against the inner side of the piston. This arrangement permits movement of the rack to the left so as to compress the spring 31 while the piston 23 remains stationary. In other words, when working pressure is applied to the piston 22, while there is working pressure on the piston 23, the piston 22 will move forward until the spring 31 is fully compressed. This movement causes the cam shaft to move one step to close the motor circuit as will hereinafter appear.

On the top of the cylinder casing is the reverse switch RS comprising a drum P and means for operating the same. The drum is operated pneumatically by means of a double acting piston 32 connected with the cylinder by arm 33. The movement to make the "forward" connections for the motors is controlled by electromagnetic valve $f$, while the movement in the direction to connect the motors for reverse operation is controlled by electromagnetic valve $r$. The construction of this reversing switch forms no part of my invention and need not therefore be described in further detail. The valves $f$ and $r$ are of substantially the same character as the valves 28 and 29 and in fact may be of any well known design.

The exhaust port for the off magnet valve 29 has connected thereto a pipe 55 leading to the valve 56 having an exhaust opening 57 which is of such an area that the speed of the electro-pneumatic motor will be properly decreased preparatory to stopping at the definite control points. A piston 58, operated by means of the pawl 59 having a roller 60 at its end which rolls on the cam surface of the star wheel 61, is provided for opening an additional normally closed exhaust port 62 when the controller reaches one of its definite control points. The large exhaust port 62 thereby supplements the exhaust port 57 and exhausts the air from chamber 25 quickly preparatory to starting to the next This makes a circuit in parallel with the circuit through the throttle contacts, this parallel circuit being through contacts 38 and 44 on the potential relay B and overload relay OR respectively. The throttle may therefore open, but the movement of the cam shaft will not be interrupted until the circuit is interrupted at contact H and established on the second contact G, which it will be observed, will be when the controller has completed a step to position $b'$. If, therefore, the current has not dropped to the proper value when the cam shaft has completed its step, it cannot take another step until the current does drop so as to energize the "off" magnet through the throttle contacts. When the current does drop to a proper value, the "off" magnet will again be energized to cause the cam shaft to take another step which short circuits the resistance $R^3$ through cam 50'. Again the throttle will prevent further movement of the controller until the current drops to proper value, whereupon another step will be taken by the cam shaft which will short circuit the resistance $R^4$. When the cam shaft moves to the next step ($c'$ on the main controller) in which the fields of the motors are tapped to give increased speed, the progression will stop, by reason of the fact that one of the contacts G, marked 52, is offset from the others so as to interrupt the circuit of the "off" magnet through both sets of contacts G and H. In order to progress further, it is necessary for the master controller to be moved to position $c$ in which the "off" magnet is energized through the contacts 53, on the master controller, and the contact 52 which engages with contact finger 54. The movement of the master controller to the position $c$, therefore, causes the cam shaft to take one step (to position $d'$) which changes the motor connections from full series with tapped or weakened field, which is the highest speed position in series, to the parallel position. When this position is reached, the progression is stopped by reason of the fact that the contact 54 passes over the contact 52. In order to progress further, it is necessary that the master controller be moved to the position $d$, in which the "off" magnet will be again energized in the regular way and the cam shaft moved forward step by step in the manner above described under the control of the throttle, until the full parallel position is reached. The main controller will be returned to the "off" position at any time by the deënergization of the "on" magnet controlling the electromagnetic valve 28. This will exhaust the cylinder 24 to atmosphere so that the pressure in cylinder 25 will move the rack 21 to the right and hence turn the controller back to "off" position. This deënergization of the "on" magnet to turn the controller will be accomplished by the deënergization of the potential relay B. If for instance, the power should fail, even for an instant, the potential relay will drop thereby deënergizing the "on" magnet at the contact 38 of the relay. It will be noted that this potential relay is energized through the contact 36 in the "off" position of the main controller, but that as soon as the controller moves from "off" position a holding circuit is made through a resistance $r''$. If therefore, the potential relay should open, it can only be closed if the main controller is in the "off" position. The reverser RS is also interlocked with the main controller at contact 40 so that the valve magnets $f$ and $r$ can only be energized in the "off" position of the controller. The opening of the potential relay causes the opening of the line breaker LB which in turn causes the opening of the line breaker LB' and causes another break in the circuit of the "on" magnet so that the controller will be returned to "off" position. It will be understood of course, that at any time when the controller is advancing automatically under the control of the throttle, progression may be stopped by moving back one step on the master controller, which will deënergize the "off" magnet and balance the pressure in the two cylinders. For instance, if the master controller is in position $b$ and the main controller is advancing to make the various connections in series, progression may be stopped by bringing the master controller back to the position $a$. Likewise if the master controller is in position $d$ the automatic progression may be stopped by moving the master controller back to the position $c$. When the master controller is moved to the "off" position, the "on" magnet will be deënergized and the main controller returned to "off" position. Upon the occurrence of an overload, the overload relay OR will cause the motor circuit to be opened at the line breakers and stop the motors. This overload relay is of the reset type, that is, when it opens it is latched open. The line breakers cannot be closed until the overload relay is reset and then can only be closed by moving the switch 34 on to its right-hand contact which will energize the magnet 55 to release the latch and allow the relay to close the operating circuits of the line breakers.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

This makes a circuit in parallel with the circuit through the throttle contacts, this parallel circuit being through contacts 38 and 44 on the potential relay B and overload relay OR respectively. The throttle may therefore open, but the movement of the cam shaft will not be interrupted until the circuit is interrupted at contact H and established on the second contact G, which it will be observed, will be when the controller has completed a step to position $b'$. If, therefore, the current has not dropped to the proper value when the cam shaft has completed its step, it cannot take another step until the current does drop so as to energize the "off" magnet through the throttle contacts. When the current does drop to a proper value, the "off" magnet will again be energized to cause the cam shaft to take another step which short circuits the resistance $R^3$ through cam 50'. Again the throttle will prevent further movement of the controller until the current drops to proper value, whereupon another step will be taken by the cam shaft which will short circuit the resistance $R^4$. When the cam shaft moves to the next step ($c'$ on the main controller) in which the fields of the motors are tapped to give increased speed, the progression will stop, by reason of the fact that one of the contacts G, marked 52, is offset from the others so as to interrupt the circuit of the "off" magnet through both sets of contacts G and H. In order to progress further, it is necessary for the master controller to be moved to position $c$ in which the "off" magnet is energized through the contacts 53, on the master controller, and the contact 52 which engages with contact finger 54. The movement of the master controller to the position $c$, therefore, causes the cam shaft to take one step (to position $d'$) which changes the motor connections from full series with tapped or weakened field, which is the highest speed position in series, to the parallel position. When this position is reached, the progression is stopped by reason of the fact that the contact 54 passes over the contact 52. In order to progress further, it is necessary that the master controller be moved to the position $d$, in which the "off" magnet will be again energized in the regular way and the cam shaft moved forward step by step in the manner above described under the control of the throttle, until the full parallel position is reached. The main controller will be returned to the "off" position at any time by the deënergization of the "on" magnet, controlling the electromagnetic valve 28. This will exhaust the cylinder 24 to atmosphere so that the pressure in cylinder 25 will move the rack 21 to the right and hence turn the controller back to "off" position. This deënergization of the "on" magnet to turn the controller will be accomplished by the deënergization of the potential relay B. If for instance, the power should fail, even for an instant, the potential relay will drop thereby deënergizing the "on" magnet at the contact 38 of the relay. It will be noted that this potential relay is energized through the contact 36 in the "off" position of the main controller, but that as soon as the controller moves from "off" position a holding circuit is made through a resistance $r''$. If therefore, the potential relay should open, it can only be closed if the main controller is in the "off" position. The reverser RS is also interlocked with the main controller at contact 40 so that the valve magnets $f$ and $r$ can only be energized in the "off" position of the controller. The opening of the potential relay causes the opening of the line breaker LB which in turn causes the opening of the line breaker LB' and causes another break in the circuit of the "on" magnet so that the controller will be returned to "off" position. It will be understood of course, that at any time when the controller is advancing automatically under the control of the throttle, progression may be stopped by moving back one step on the master controller, which will deënergize the "off" magnet and balance the pressure in the two cylinders. For instance, if the master controller is in position $b$ and the main controller is advancing to make the various connections in series, progression may be stopped by bringing the master controller back to the position $a$. Likewise if the master controller is in position $d$ the automatic progression may be stopped by moving the master controller back to the position $c$. When the master controller is moved to the "off" position, the "on" magnet will be deënergized and the main controller returned to "off" position. Upon the occurrence of an overload, the overload relay OR will cause the motor circuit to be opened at the line breakers and stop the motors. This overload relay is of the reset type, that is, when it opens it is latched open. The line breakers cannot be closed until the overload relay is reset and then can only be closed by moving the switch 34 on to its right-hand contact which will energize the magnet 55 to release the latch and allow the relay to close the operating circuits of the line breakers.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. Electric motor controlling means, comprising a controller for the motor circuit, a fluid motor for operating the controller, valve mechanism for controlling the fluid motor, and means operated responsively to the movement of the controller for operating the said valve mechanism to cause the fluid motor to take a quick start and for effecting a reduction in the speed of the same preparatory to stopping.

2. Electric motor controlling means, comprising a controller for the motor circuit, a fluid motor for operating the controller step by step, valve mechanism for controlling the fluid motor, and means operated responsively to the movement of the controller for controlling the valve mechanism to vary the speed of the operating means between the control steps.

3. Electric motor controlling means, comprising a controller for the motor circuit, a fluid motor for operating the controller step by step, valve mechanism for controlling the fluid motor, and means operated responsively to the movement of the controller for automatically operating the said valve mechanism to reduce the speed of the fluid motor preparatory to stopping the controller at a control point.

4. Electric motor controlling means, comprising a controller for the motor circuit, pneumatic operating means for advancing the controller step by step, valve mechanism for controlling the operating means, and means for automatically operating the valve mechanism to cause the pneumatic operating means to make a quick start at the beginning of a control step and to cause the speed of the operating means to be automatically gradually reduced before the control step is completed.

5. Electric motor controlling means, comprising a controller for the motor circuit, pneumatic operating means therefor having a piston and cylinder for each direction of movement, valves for controlling the air pressure in the cylinders, means for operating the valves to cause air under pressure to be admitted to the "on" cylinder and exhausted from the "off" cylinder, and means for automatically increasing the effective area of the exhaust port for the "off" cylinder at the start of each step so that a quick start for taking the control step may be had.

6. Electric motor controlling means, comprising a controller for the motor circuit, pneumatic operating means therefor having a piston and cylinder for each direction of movement, valves for controlling the air pressure in the cylinders, means for operating the valves to cause air under pressure to be admitted to the "on" cylinder, and exhausted from the "off" cylinder so that the taking of a control step will be started, and means for automatically reducing the effective area of the exhaust port for the "off" cylinder after the controller has started to take a step so that the speed of the controller will be reduced preparatory to stopping at a control point.

7. Electric motor controlling means, comprising a controller for the motor circuit, pneumatic operating means therefor having a piston and cylinder for each direction of movement, valves for controlling the air pressure in the cylinders, means for operating the valves to cause air under pressure to be admitted to the "on" cylinder and exhausted from the "off" cylinder, and means for automatically quickly reducing the air pressure in the "off" cylinder at the start of each step so that a quick start may be had, and for automatically increasing the resistance offered to the exhaust of the air from the "off" cylinder for the remainder of the step so that the speed of the controller will be reduced preparatory to stopping at the control point.

8. Electric motor controlling means, comprising a controller for the motor circuit, pneumatic operating means therefor having a piston and cylinder for each direction of movement, valves for controlling the air pressure in the cylinders, means for operating the valves to cause air under pressure to be admitted to the "on" cylinder and exhausted from the "off" cylinder to move the controller from one definite control point to another, and means operated responsively to the pressure of air in the exhaust passages of the "off" cylinder for increasing the effective area of the exhaust port for the "off" cylinder when the controller is on one of its definite control points.

9. Electric motor controlling means, comprising a controller for the motor circuit, pneumatic operating means therefor having a piston and cylinder for each direction of movement, valves for controlling the air pressure in the cylinders, means for operating the valves to cause the air under pressure to be admitted to the "on" cylinder and exhausted from the "off" cylinder to move the controller from one definite control point to another, and means for automatically opening an additional exhaust port when the controller has reached the next definite control point and the air pressure in the exhaust passages has dropped to a predetermined value.

10. Electric motor controlling means, comprising a controller for the motor circuit, pneumatic operating means therefor having a piston and cylinder for each direction of movement, valves for controlling the air pressure in the cylinders, means for operating the valves to cause air under pressure to be admitted to the "on" cylinder and exhausted from the "off" cylinder to move the controller from one definite control point to another, and means operated responsively to the movement of the controller and to the pressure of air in the exhaust passages of the "off" cylinder for increasing the effective area of the exhaust port for the "off" cylinder when the controller is on one of its definite control points.

11. Electric motor controlling means, comprising a controller for the motor circuit, pneumatic operating means therefor comprising a piston and cylinder for each direction of movement, a valve normally open to atmosphere and closed to the source of air under pressure for controlling the "on" cylinder, a valve normally open to the source of air under pressure and closed to atmosphere for controlling the "off" cylinder, means for operating the said valves to admit air to the "on" cylinder and exhaust air from the "off" cylinder, and means operated responsively to the movement of the controller for opening an additional exhaust port for the "off" cylinder after each control step has been taken and for closing said additional exhaust port after the controller has started to take a step, whereby a quick start in taking the control step is had and the speed of the controller is reduced preparatory to stopping at the next control point.

In witness whereof, I have hereunto set my hand this 27th day of September, 1919.

JOHN F. TRITLE.